US 7,009,254 B2

(12) United States Patent
Nagasawa et al.

(10) Patent No.: US 7,009,254 B2
(45) Date of Patent: Mar. 7, 2006

(54) ELECTRO-OPTICAL DEVICE AND ELECTRONIC APPARATUS

(75) Inventors: Hitoya Nagasawa, Chino (JP); Kenya Ishii, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/089,140

(22) Filed: Mar. 25, 2005

(65) Prior Publication Data

US 2005/0230757 A1 Oct. 20, 2005

(30) Foreign Application Priority Data

Apr. 20, 2004 (JP) .............................. 2004-124584

(51) Int. Cl.
*H01L 23/62* (2006.01)

(52) U.S. Cl. .......................... 257/355; 257/59; 257/72
(58) Field of Classification Search ..................... None
See application file for complete search history.

(56) References Cited

U.S. PATENT DOCUMENTS

2004/0032553 A1 * 2/2004 Hong .......................... 349/113

FOREIGN PATENT DOCUMENTS

| JP | A-2001-83546 | 3/2001 |
| JP | A-2003-177423 | 6/2003 |
| JP | A-2003-249659 | 9/2003 |

* cited by examiner

*Primary Examiner*—Tu-Tu Ho
(74) *Attorney, Agent, or Firm*—Oliff & Berridge PLC

(57) ABSTRACT

An electro-optical device includes a plurality of pixels, a sampling circuit, electrostatic protection circuits, constant potential lines, and image signal lines. The electrostatic protection circuits switching elements having first terminals and second terminals. The first terminals are electrically connected to the second terminals when an over voltage is applied to the first terminals. The constant potential lines are connected to the second terminals of the switching elements via contact holes of the first insulating layer. The image signal lines transmit image signals supplied to input terminals to the sampling circuit. The image signal lines include first wiring line portions connected to the first terminals of the switching elements via the contact holes of the first insulating layer, and a second wiring line portion connected to the first wiring line portion via contact holes of the second insulating layer.

7 Claims, 7 Drawing Sheets

ELECTRO-OPTICAL DEVICE AND ELECTRONIC APPARATUS

BACKGROUND OF THE INVENTION

1. Technical Field

The present invention relates to an electro-optical device using an electro-optical material such as liquid crystal, and more particularly to a technique for protecting circuits of the electro-optical device from overvoltage.

2. Related Art

In electro-optical devices such as liquid crystal devices, a plurality of pixels arranged on a substrate is driven by various signals supplied from input terminals arranged along the circumference of the substrate via wiring lines. For example, image signals (for example, signals having signal levels according to gray levels to be displayed) supplied from the input terminals via image signal lines are sampled by a sampling circuit and are supplied to the pixels. With this configuration, there may be a case where a sudden overvoltage (a pulse having a differential waveform, such as a spike or surge) due to static electricity occurring in the input terminals is applied to the wiring lines. Such an overvoltage may cause a damage to parts of the electro-optical device, such as switching elements composing the sampling circuit. To overcome this problem, there has been proposed a technique of suppressing the overvoltage using electrostatic protection circuits connected to wiring lines. In this case, the electrostatic protection circuits are arranged to be connected to portions branched from the wiring lines when viewed from the direction perpendicular to a substrate. However, for such an arrangement where the electrostatic protection circuits are spaced apart from the wiring lines, there is a need to secure an additional space for forming the electrostatic protection circuits separately from a space for forming the wiring lines. On this account, there may arise a problem in that it is difficult to reduce the size of a region (a so-called frame) surrounding a display region. Particularly, when the number of wiring lines is increased in order to obtain high-definition display images, this problem becomes more serious since the space in which the electrostatic protection circuits of the wiring lines are arranged is forced to be enlarged.

SUMMARY

An advantage of the present invention is to reduce a space required to arrange an electrostatic protection circuit.

To achieve the advantage, a first aspect of the invention provides an electro-optical device comprising a plurality of pixels that are arranged above a surface of a substrate, corresponding to intersections of a plurality of scanning lines and a plurality of data lines; a sampling circuit that samples image signals and supplies the sampled image signals from the data lines to the pixels when the scanning lines are selected; electrostatic protection circuits that include switching elements having first terminals and second terminals, the first terminals being electrically connected to the second terminals when an overvoltage is applied to the first terminals; static potential wiring lines that are formed on a surface of a first insulating layer covering the switching elements and are connected to the second terminals of the switching elements via contact holes of the first insulating layer, substantially constant potentials being applied to the static potential wiring lines; and image signal lines that transmit the image signals supplied to input terminals to the sampling circuit, wherein the image signal lines include first wiring line portions formed of the same conductive film as the static potential wiring lines, the first wiring line portions being spaced apart from the static potential lines, and connected to the first terminals of the switching elements via the contact holes of the first insulating layer, and a second wiring line portion formed on a surface of a second insulating layer covering the static potential wiring lines and the first wiring line portions, connected to the first wiring line portion via contact holes of the second insulating layer, and extends to intersect with the static potential wiring lines when viewed from a direction perpendicular to the surface of the substrate. The electro-optical device according to the present invention can be employed as typical displays of various electronic apparatuses. Here, the electro-optical device is referred to as a device including substance (i.e., electro-optical substance) whose optical properties, such as transmittance or brightness, are varied by an action of electrical energy, such as current and voltage. A typical example of such electro-optical substance may include liquid crystal whose transmittance is varied by an orientation variation according to an applied voltage, OLED elements such as organic electroluminescent (EL) elements, whose brightness is varied according to a supplied current, etc. However, the electro-optical substance employed for the electro-optical device according to the invention is not limited to this.

According to the first aspect of the invention, since the first insulating layer is formed to cover the switching elements of the electrostatic protection circuits, the static potential wiring lines and the first wiring line portions of the image signal lines are connected to the switching elements via the contact holes of the first insulating layer, and the second wiring line portions are connected to the first wiring line portions via the contact holes of the second insulating layer, the electrostatic protection circuits can be arranged in regions in which the electrostatic protection circuits overlap with the static potential wiring lines and the image signal lines when viewed from the direction perpendicular to the surface of the substrate. Accordingly, as compared to the configuration where the electrostatic protection circuits are arranged at positions spaced apart from the image signal lines or the static potential wiring lines when viewed from the direction perpendicular to the surface of the substrate, a space on the substrate required to arrange the image signal lines, the static potential wiring lines and the electrostatic protection circuits can be reduced. In addition, in the invention, since the image signal lines have the second wiring line portions connected to the first wiring line portions and extending to intersect with the static potential wiring lines, the resistance of the image signal line can be suppressed to be low. In addition, the second wiring line portion in the invention is a portion whose end portion extending to the outer edge of the substrate comprises an input terminal or a portion whose end portion extending to reach the outer edge of the substrate is connected to an input terminal (a so-called pad). With the configuration where the second wiring line portion is integrally formed over the overall length of the image signal line, the resistance of the image signal line can be more reliably reduced.

According to a second aspect of the invention, the electrostatic protection circuits include first and second switching elements each having the first and second terminals, the static potential wiring lines include a first static potential wiring line connected to the second terminals of the first switching elements and a second static potential wiring line extending in the substantially same direction as the first static potential wiring line and connected to the second terminals of the second switching elements, a potential applied to the second static potential wiring line being lower than a potential applied to the first static potential wiring line, and the first wiring line portions of the image signal lines are formed between the first static potential wiring line and the second static potential wiring line, and the second wiring line portion extends to intersect with both of the first static potential wiring line and the second static potential wiring line. With this configuration, since the electrostatic protection circuit has the first switching element connected to the first static potential wiring line and the second static potential wiring line to which a positive potential lower than a potential applied to the first static potential wiring line is applied, both of positive and negative polarity overvoltages for a certain potential (for example, an intermediate potential between a first potential and a second potential) can be suppressed. Accordingly, the breakage of the elements of the electro-optical device due to the overvoltage can be more reliably prevented. In this configuration, when the first static potential wiring line is a power line to which a higher-side potential of a power source is applied, and the second static potential wiring line is a ground line to which a lower-side potential of the power source is applied, a configuration may be simplified and the overvoltage can be reliably suppressed as compared to a case where different wiring lines are used as the static potential wiring lines.

The image signal line is a wiring line to which the image signals specifying gray levels of the pixel are supplied. If the resistance of the image signal line is high, since a waveform of the image signal may become blunt and delayed, which may result in deterioration of display quality, the image signal line is required to have low resistance. In this respect, according to a third aspect of the invention, the image signal lines have a plurality of third wiring line portions formed of the same conductive film as the first and second static potential wiring lines and the first wiring line portions and arranged in a direction in which the second wiring line portion extends, and the second wiring line portion is connected to the first wiring line portions and the third wiring line portions via the contact hole of the second insulating layer. In this aspect, since the third wiring line portion in addition to the first wiring line portion is connected to the second wiring line portion, the resistance of the image signal line can be reduced as compared to a configuration where only the first wiring line portion is connected to the second wiring line portion. In the aspect of the invention, more preferably, each of the plurality of third wiring line portions is arranged at a position at which each of the static potential wiring lines is interposed between the first wiring line portion and the third wiring line portion when viewed from the direction perpendicular to the surface of the substrate. With this configuration, the space on the surface of the substrate can be effectively utilized.

Since the second wiring line portion in the invention is electrically isolated from the static potential wiring lines via the insulating layer, the width of the second wiring line portion can be selected irrespective of the static potential wiring lines. Since the image signal line is required to have the low resistance, as described above, it is preferable to secure the width of the image signal line as wide as possible. Therefore, according to a fourth aspect of the present invention, the first switching elements and the second switching elements are interposed between the first static potential wiring line and the second static potential wiring line when viewed from the direction perpendicular to the surface of the substrate, the first static potential wiring line has branch portions projecting toward the second static potential wiring line in one side in the width direction of the image signal line and connected to the second terminals of the first switching elements, and the second static potential wiring line has branch portions projecting toward the first static potential wiring line in the other side in the width direction of the image signal line and connected to the second terminals of the second switching elements, and the second wiring line portions of the image signal lines have a width equal to the width by which the second wiring line portions overlap with the branch portions of the first static potential wiring line and the branch portions of the second static potential wiring line when viewed from the direction perpendicular to the surface of the substrate (see FIG. 12). In this aspect, since the width of the second wiring line portion can be largely secured, the resistance of the image signal line can be reduced.

BRIEF DESCRIPTION OF THE DRAWINGS

The present invention will be described with reference to the accompanying drawings, wherein like numbers reference like elements, and wherein.

DESCRIPTION OF THE EMBODIMENTS

A: Configuration of Liquid Crystal Display

Figure 1:
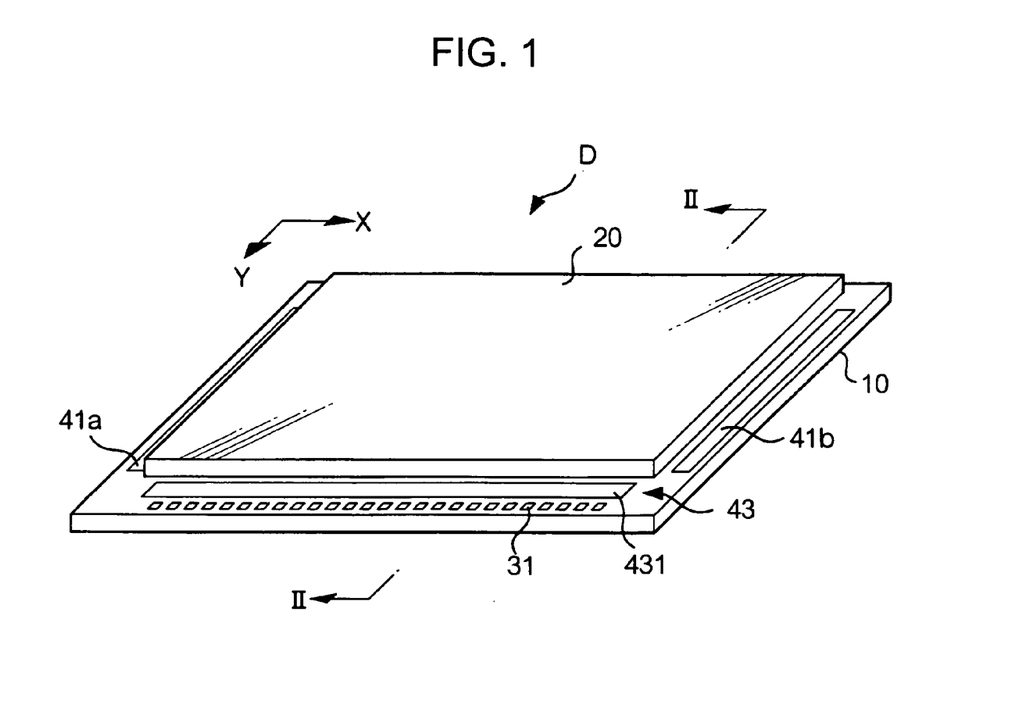
FIG. 1 is a perspective view illustrating a configuration of a liquid crystal display according to an embodiment of the invention.
Figure 2:
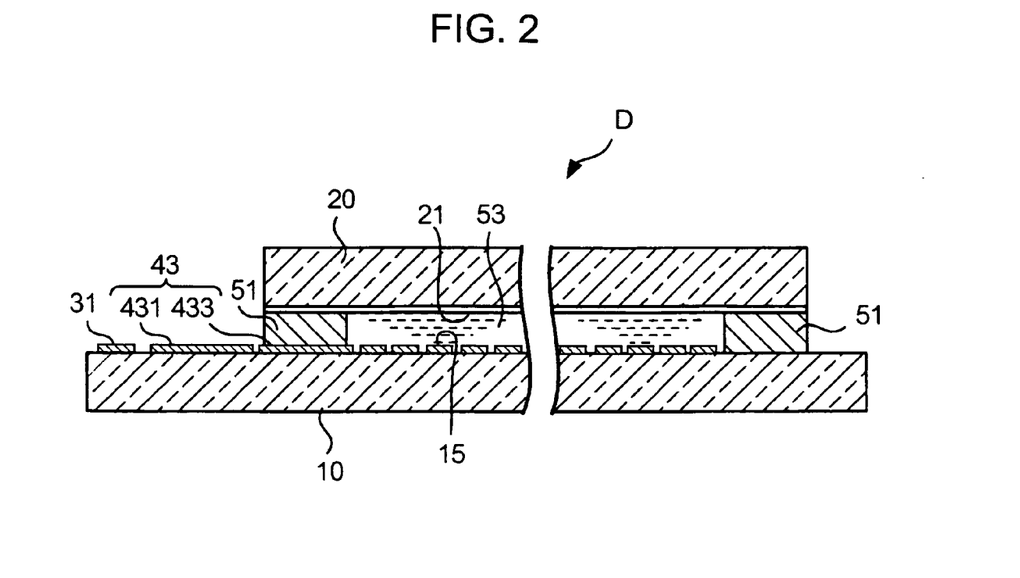
FIG. 2 is a sectional view taken along line II—II of FIG. 1.

To begin with, an application of the present invention to a liquid crystal display using liquid crystal as an electro-optical material will be described. FIG. 1 is a perspective view illustrating a configuration of a liquid crystal display according to an embodiment of the invention, and FIG. 2 is a sectional view taken along line II—II of FIG. 1. As shown in these figures, a liquid crystal device D has an element substrate 10 and an opposite substrate 20, which are bonded opposite to each other, with a certain gap therebetween, via a sealant 51. Liquid crystal 53 is sealed in a space surrounded by both substrates 10 and 20 and the sealant 51. An opposite electrode 21 is formed on substantially the entire region of a surface of the opposite substrate 20 opposite to the liquid crystal 53. The opposite electrode 21 is made of a light-transmissive conductive material such as indium tin oxide (ITO).

Figure 3:
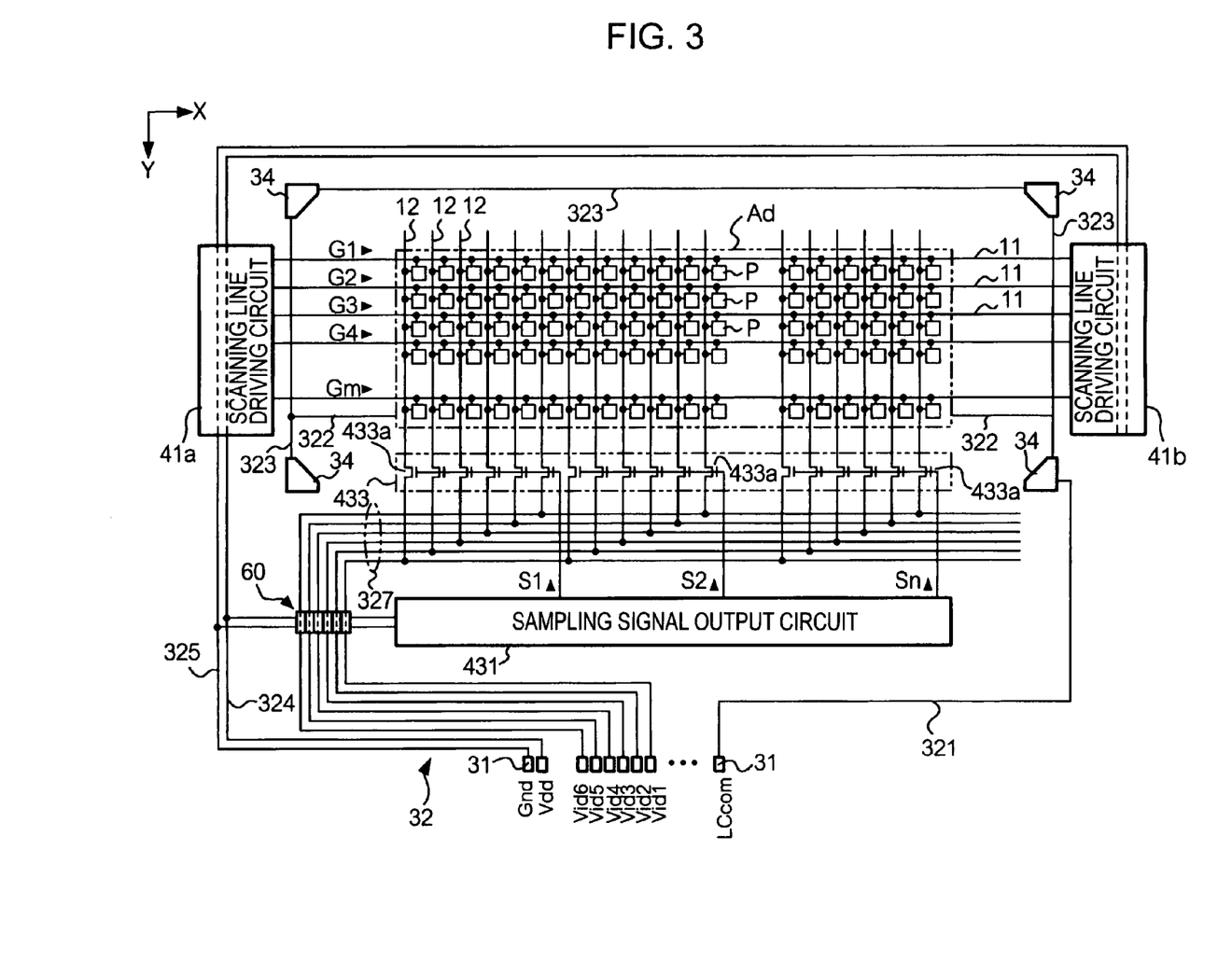
FIG. 3 is a block diagram illustrating configurations of various elements formed on an element substrate of the liquid crystal display of FIG. 1.
Figure 4A:
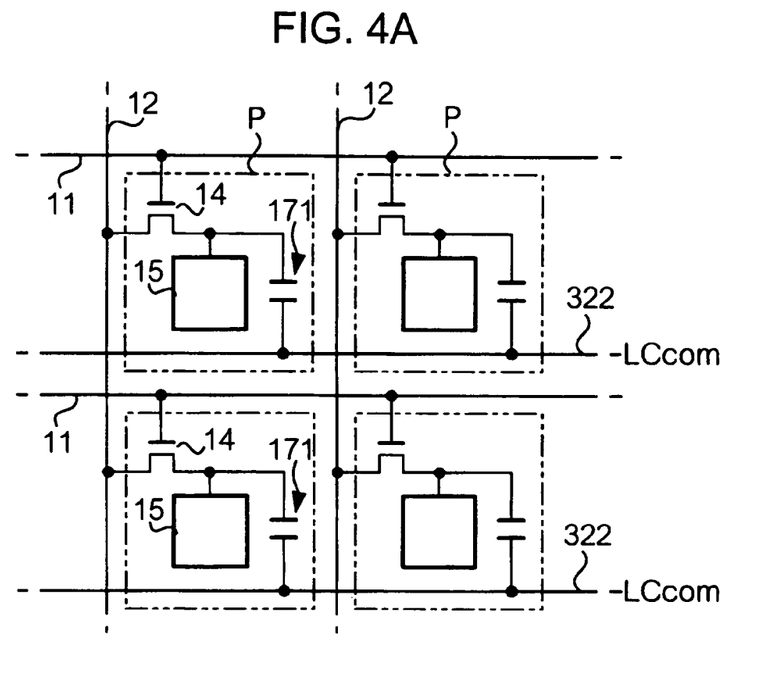
FIGS. 4A and 4B are circuit diagrams illustrating electrical configurations of pixels.
Figure 4B:
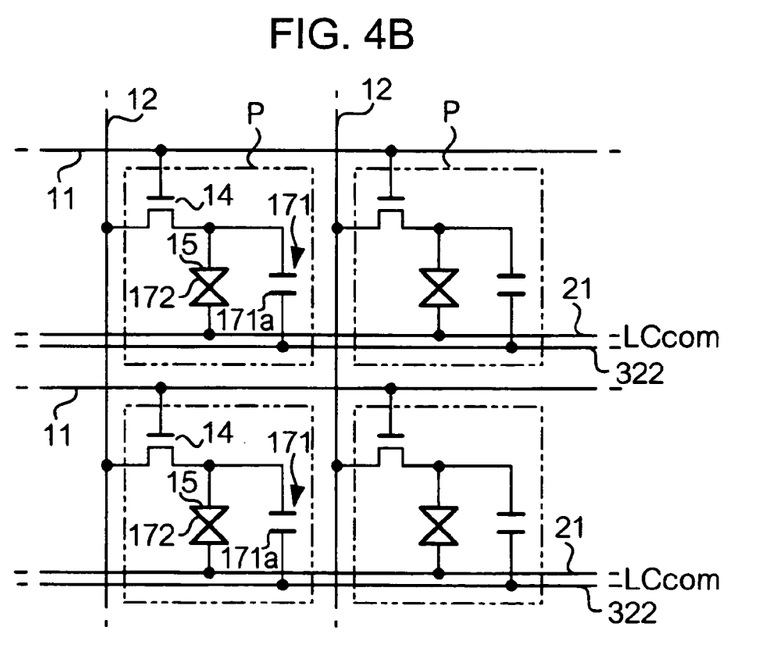

FIG. 3 is a block diagram illustrating configurations of various elements formed on a surface of the element substrate 10 opposite to the liquid crystal 53. As shown in the figure, m scanning lines 11 extending in an X direction (as shown in the figure) and 6n data lines 12 extending in a Y direction perpendicular to the X direction (each of m and n is a natural number) are formed on the surface of the element substrate 10 opposite to the liquid crystal 53. The 6n data lines 12 are divided into n blocks, each of which has 6 data lines. Pixels P are disposed at intersections of the scanning lines 11 and the data lines 12. A display region Ad shown in FIG. 3 is a region in which the pixels P are arranged in the form of an m×6n matrix. As shown in FIG. 4A, each pixel P includes a thin film transistor 14 (hereinafter, referred to as a pixel transistor) connected to a scanning line 11 and a data line 12 and a pixel electrode 15 connected to the pixel transistor 14. In more detail, the pixel transistor 14 has a gate electrode connected to the scanning line 11, a source electrode connected to the data line 12, and a drain electrode connected to the pixel electrode 15. The pixel electrode 15 is a roughly rectangular electrode made of a light-transmissive conductive material such as ITO. Since the liquid crystal device D is configured in such a manner that the liquid crystal 53 is interposed between the element substrate 10 and the opposite substrate 20, as described above, the pixel P has a liquid crystal capacitor 172 formed by the pixel electrode 15, the opposite electrode 21, and the liquid crystal 53 interposed between both electrodes 15 and 21, as shown in FIG. 4B. In addition, in the embodiment, the pixel P has a storage capacitor 171 connected in parallel to the liquid crystal capacitor 172. The storage capacitor 171 has one end connected to the drain electrode of the pixel transistor 14 and the other end connected to a capacitor line 322.

Figure 5:
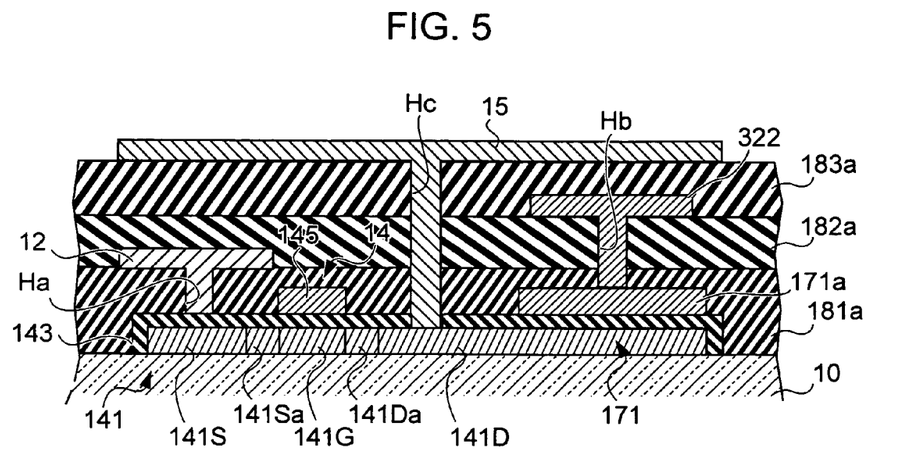
FIG. 5 is an enlarged sectional view illustrating elements of one pixel of the liquid crystal display of FIG. 1.

FIG. 5 is an enlarged sectional view illustrating elements of one pixel P. As shown in the figure, the pixel transistor 14 has a semiconductor layer 141 made of polysilicon on a surface of the element substrate 10, a gate insulator 143 formed on a surface of the semiconductor layer 141 by a thermal process, and a gate electrode 145 branched from the scanning line 11. Of the semiconductor layer 141, a region opposite to the gate electrode 145, via the gate insulator 143, is a channel region 141G. The semiconductor layer 141 has a so-called lightly doped drain (LDD) structure. In other words, the semiconductor layer 141 has a lightly doped source region 141Sa and a lightly doped drain region 141Da, which are formed with the channel region interposed therebetween, a heavily doped source region 141S adjacent to the light doped source region 141Sa, and a heavily doped drain region 141D adjacent to the light doped drain region 141Da. On the other hand, a storage-capacitor electrode 171a shown in FIG. 5, which is a film formed by the same material (for example, polysilicon) and in the same process as the gate electrode 145, is opposite to the heavily doped drain region 141D, with the gate insulator 143 therebetween. In this way, the storage capacitor 171 shown in FIGS. 4A and 4B is formed by opposing the heavily doped drain region 141D of the semiconductor layer 141 to the storage-capacitor electrode 171a via the gate insulator 143, which is a dielectric. On the other hand, the surface of the element substrate 10 on which the semiconductor layer 141, the gate electrode 145, and the storage-capacitor electrode 171a are formed is covered with a first insulating layer 181a. The data line 12 is formed on a surface of the first insulating layer 181a and is electrically connected to the heavily doped source region 141S via a contact hole Ha passing through the first insulating layer 181a and the gate insulator 143. The surface of the first insulating layer 181a on which the data line 12 is formed is covered with a second insulating layer 182a. The capacitor line 322 is formed on a surface of the second insulating layer 182a and is electrically connected to the storage-capacitor electrode 171a via a contact hole Hb passing through the second insulating layer 182a and the first insulating layer 181a. In addition, the surface of the second insulating layer 182a on which the capacitor line 322 is formed is covered with a third insulating layer 183a. The pixel electrode 15 is formed on a surface of the third insulating layer 183a and is electrically connected to the heavily doped drain region 141D of the semiconductor layer 141 via a contact hole Hc passing through the third insulating layer 183a, the second insulating layer 182a, the first insulating layer 181a, and the gate insulator 143.

As shown in FIGS. 1 to 3, a data line driving circuit 43 and scanning line driving circuits 41a and 41b are arranged in a region (hereinafter, referred to as a peripheral region) of the element substrate 10 projecting from the opposite substrate 20. The data line driving circuit 43 is formed along an outer edge of the peripheral region extending in the X direction and has a sampling circuit 433 including the 6n switching elements 433a corresponding to the total number of the data lines 12 and a sampling signal output circuit 431 arranged at a previous stage of the sampling circuit 433 for controlling operation of the switching elements 433a, as shown in FIG. 3. One end of each data line 12 is connected to a corresponding switching element 433a of the sampling circuit 433. On the other hand, the scanning line driving circuits 41a and 41b are formed in the peripheral region, with the display region Ad interposed therebetween in the X direction. Each scanning line 11 has one end connected to the scanning line driving circuit 41a and the other end connected to the scanning line driving circuit 41b. With this configuration, the scanning line driving circuits 41a and 41b supply scan signals Gi (i is an integer satisfying the condition $1 \leq i \leq m$), which enter an active state in turn every one horizontal scan period, to the scanning lines 11. When the scan signal Gi enters the active state, pixel transistors 14 of one row pixels (6n in total) connected to an i-th row scanning line 11 are simultaneously turned on. On the other hand, when any one scanning line 11 is selected by the scanning line driving circuits 41a and 41b (that is, when the scan signal Gi supplied to any one scanning line 11 enters the active state), the data line driving circuit 43 supplies image signals Vid1 to Vid6 of pixels P in one row corresponding to the scanning line 11 to the pixel electrodes 15 from the data line 12 via the pixel transistor 14 every block. Switching elements (for example, the switching elements 433a of the sampling circuit 433) composing each scanning line driving circuit 41 and the data line driving circuit 43 have the same configuration as the pixel transistor 14 shown in FIG. 5 and are formed by the same material and in the same process as the pixel transistor 14. That is, in the embodiment, the liquid crystal device D is of a peripheral circuit-embedded type.

In addition, a plurality of connection terminals 31 arranged in the X direction is formed in a region of the peripheral region interposed between the outer edge of the peripheral region extending in the X direction and the data line driving circuit 43. Various signals supplied from an external circuit, such as a control circuit (not shown), of an electronic apparatus equipped with the liquid crystal device D are inputted to the liquid crystal device D via the connection terminals 31. The signals inputted to the connection terminals 31 are supplied to components of the liquid crystal device D via the wiring lines 32 formed on the surface of the element substrate 10. The signals inputted to the connection terminals 31 include a higher-side potential Vdd of a power source, a lower-side potential (ground potential) Gnd of the power source, a common potential LCcom applied to the opposite electrode 21, and the image signals Vid1 to Vid6 for specifying gray levels (brightnesses) of the pixels P, in addition to various control signals (not shown) such as a horizontal synchronization signal and a vertical synchronization signal.

On the element substrate 10 are formed a wiring line 32 (hereinafter, particularly referred to as a power line 324) for supplying the higher-side potential Vdd to components, such as the data line driving circuit 43 and the scanning line driving circuits 41, of the liquid crystal device D and another wiring line 32 (hereinafter, particularly referred to as a ground line 325) for supplying the lower-side potential Gnd to the components of the liquid crystal device D. As shown in FIG. 3, each of the power line 324 and the ground line 325 extends in the X direction from a corresponding connection terminal 31, is bent in the Y direction near the outer edge of the element substrate 10, is bent in the X direction after passing through the scanning line driving circuit 41a, extends along the circumference of the element substrate 10, is bent again in the Y direction, and then arrives at the scanning line driving circuit 41b. In addition, each of the ground line 325 and the power line 324 has a portion branched in the X direction at the front of the scanning line driving circuit 41a and arriving at the sampling signal output circuit 431.

In addition, as shown in FIG. 3, upper and lower conductive electrodes 34 are formed in respective regions of the element substrate 10 opposite to four corners of the opposite substrate 20. The upper and lower conductive electrodes 34 are electrically connected to one another via a wiring line 323 on the element substrate 10 and are electrically connected to the opposite substrate 20 via a conductive material (not shown), such as silver paste, provided between the element substrate 10 and the opposite substrate 20. The common potential LCcom supplied to the connection terminal 31 is applied to the opposite electrode 21 via a wiring line 321, which is connected to the connection terminal 31, and the upper and lower conductive electrodes 34. In addition, the wiring line 323 to which the common potential LCcom is applied via the upper and lower conductive electrodes 34 has a branch to the display region Ad, which forms a capacitor line 322.

In addition, the image signals Vid1 to Vid6 are supplied to the sampling circuit 433 via six wiring lines 32 (hereinafter, particularly referred to as image signal lines 327) provided corresponding to the image signals. The image signals Vid1 to Vid6 are signals produced by dividing an image signal of one system, which is sequentially outputted from an external circuit in synchronization with a dot clock signal (that is, in synchronization with vertical scanning and horizontal scanning), into image signals of six systems by an image processing device (not shown) and expanding the image signals of six systems six times on the time axis. The image signal lines 327 for transmitting these image signals Vid1 to Vid6 are arranged to be extended from the connection terminals 31, intersect with the power line 324 and the ground line 325 via the neighborhood of the left end portion of the sampling signal output circuit 431, and extend in the X direction between the sampling circuit 433 and the sampling signal output circuit 431, as shown in FIG. 3. These image signal lines 327 are connected to six switching elements 433a corresponding to respective blocks of the sampling circuit 433, respectively. That is, the image signal line 327 to which the image signal Vid1 is supplied is connected to the switching element 433a at a first stage belonging to the respective blocks of the sampling circuit 433, the image signal line 327 to which the image signal Vid2 is supplied is connected to the switching element 433a at a second stage belonging to the respective blocks of the sampling circuit 433, etc. On the other hand, the sampling signal output circuit 431, which is a shift register having n stages corresponding to the total number of blocks dividing the data lines 12, commonly outputs sampling signals S1, S2, ..., Sn, which in turn enter the active state within one horizontal scan period, to the six switching elements 433a corresponding to the respective blocks. For example, the sampling signal S1 is supplied to gate electrodes of the six switching elements 433a corresponding to a first block, the sampling signal S2 is supplied to gate electrodes of the six switching elements 433a corresponding to a second block, etc. Under this configuration, when any one of the scanning lines 11 is selected, and accordingly, a sampling signal Sj (j is an integer satisfying the conditions of $1 \leq j \leq n$) enters the active state to thereby turn on the six switching elements 433a corresponding to a j-th block simultaneously, the image signals Vid1 to Vid6 supplied via the respective image signal lines 327 are sampled on six respective data lines 12 of the block and are supplied to the pixel electrodes 15.

At this time, an overvoltage (a pulse having a differential waveform, such as a spike or surge) due to static electricity occurring in the connection terminals 31 may be applied to each image signal line 327. As described above, since the image signal lines 327 are connected to the respective switching elements 433a of the sampling circuit 433, these switching elements 433a may be damaged when the overvoltage is applied from the image signal lines 327 to the switching elements 433a. In addition, the overvoltage may be applied to the pixels P via the data lines 12, which may result in damage to the pixel transistors 14. In the embodiment, in order to prevent the damage to components by suppressing the overvoltage occurring in the image signal lines 327, as shown in FIG. 3, electrostatic protection circuits 60 are arranged at intersections of the image signal lines 327, the power line 324, and the ground line 325.

Figure 6:
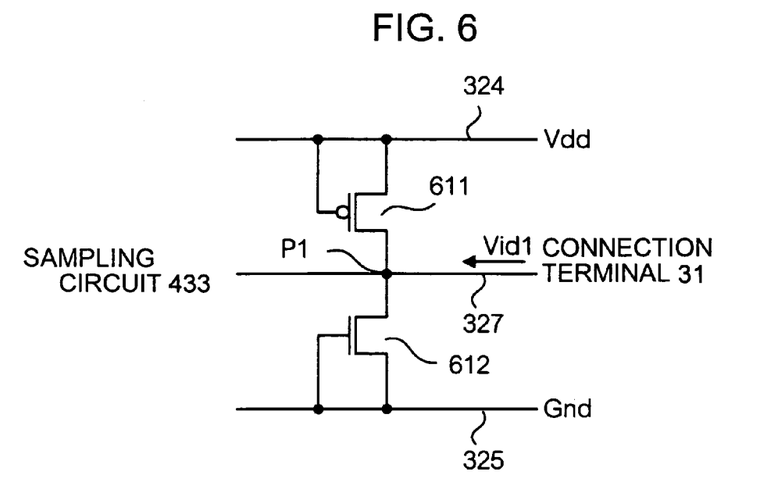
FIG. 6 is a circuit diagram illustrating an electrical configuration of an electrostatic protection circuit.

FIG. 6 is a circuit diagram illustrating a configuration of the electrostatic protection circuit 60. Although only one electrostatic protection circuit 60 corresponding to one image signal line 327 to which the image signal Vid1 is supplied is shown in this figure, the configuration of this electrostatic protection circuit 60 is also applies to other electrostatic protection circuits corresponding to the image signal lines 327 to which the image signals Vid2 to Vid6 are supplied. As shown in the figure, the electrostatic protection circuit 60 has a p-channel transistor 611 and an n-channel transistor 612. These transistors 611 and 612 are collectively formed of the same material and in the same process as the pixel transistors 14. The transistor 611 has a drain electrode connected to the image signal line 327 at a point P1, and a gate electrode and a source electrode connected in common to the power line 324, thus serving as a diode. On the other hand, the transistor 612 has a drain electrode connected to the image signal line 327 at the point P1, and a gate electrode and a source electrode connected in common to the ground line 325, thus serving as a diode. With this configuration, when a positive polarity overvoltage exceeding the higher-side potential Vdd occurs in the image signal line 327, the transistor 611 is turned on. Accordingly, the image signal line 327 is electrically connected to the power line 324, thereby suppressing the positive polarity overvoltage. On the other hand, when a negative polarity overvoltage less than the lower-side potential Gnd occurs in the image signal line 327, the transistor 612 is turned on. Accordingly, the image signal line 327 is electrically connected to the power line 324, thereby suppressing the negative polarity overvoltage. As a result, the image signals Vid1 to Vid6 are supplied to the sampling circuit 433 after the overvoltage due to the static electricity is suppressed.

Figure 7:
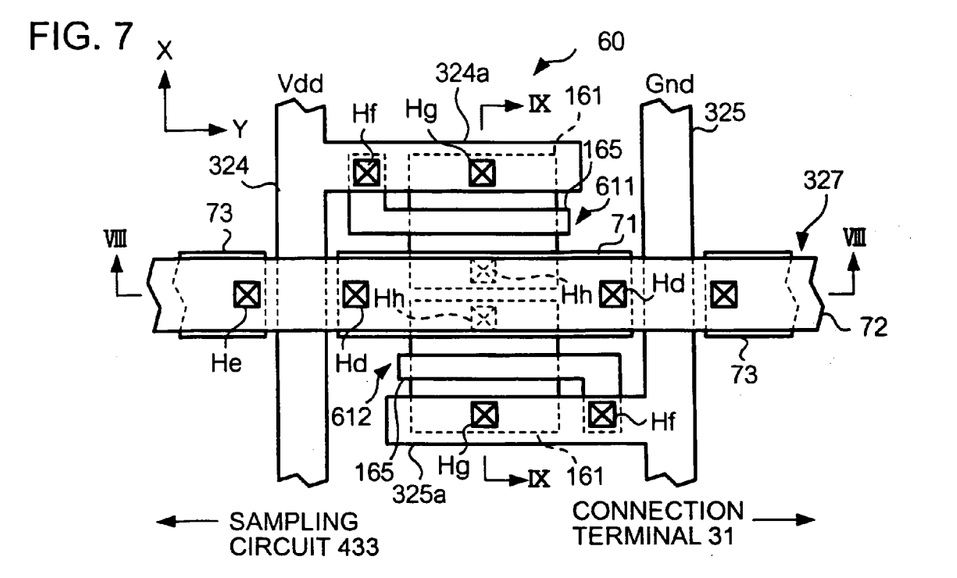
FIG. 7 is a plan view illustrating a peripheral configuration of one electrostatic protection circuit.
Figure 8:
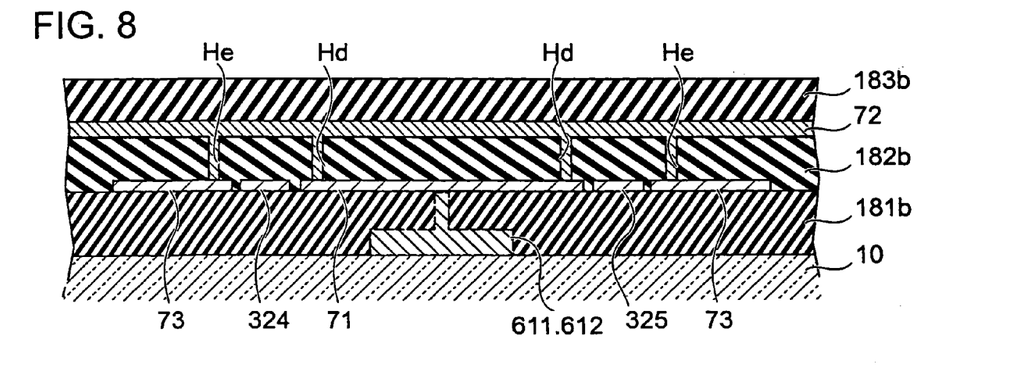
FIG. 8 is a sectional view taken along line VIII—VIII of FIG. 7.
Figure 9:
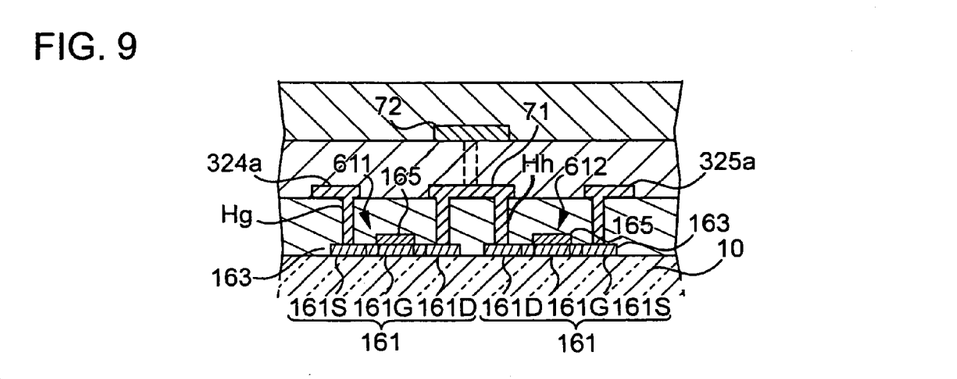
FIG. 9 is a sectional view taken along line IX—IX of FIG. 7.

Next, a detailed structure of the electrostatic protection circuit 60 will be described with reference to FIGS. 7 to 9. FIG. 7 is a plan view illustrating a configuration of the electrostatic protection circuit 60, taking note of positional relationships among the power line 324, the ground line 325 and the image signal line 327. FIG. 8 is a sectional view taken along line VIII—VIII of FIG. 7, and FIG. 9 is a sectional view taken along line IX—IX of FIG. 7. As shown in these figures, the transistors 611 and 612 of the electrostatic protection circuit 60 are arranged in a region between the power line 324 and the ground line 325, which extend in approximately parallel to each other in the X direction. Here, the power line 324 has a portion (hereinafter, referred to as a branch portion) 324a projecting toward the ground line 325 in the Y direction from a portion extending in the X direction, and the ground line 325 has a portion (similarly, referred to as a branch portion) 325a projecting toward the power line 324 in the Y direction from a portion extending in the X direction. When viewed from a direction perpendicular to the surface of the element substrate 10, as shown in FIG. 7, the transistors 611 and 612 of the electrostatic protection circuit 60 are arranged in an approximately rectangular region between the power line 324 and the ground line 325 in the Y direction and between the branch portion 324a of the power line 324 and the branch portion 325a of the ground line 325 in the X direction. On the other hand, the image signal line 327 extends in the Y direction to intersect with both of the power line 324 and the ground line 325 between the branch portion 324a of the power line 324 and the branch portion 325a of the ground line 325. Accordingly, when viewed from the direction perpendicular to the surface of the element substrate 10, the electrostatic protection circuit 60 overlaps with the image signal line 327.

On the other hand, a stack structure on the element substrate 10 is as follows. As shown in FIGS. 8 and 9, the transistors 611 and 612 formed on the element substrate 10 are covered with a first insulating layer 181b. This first insulating layer 181b is a layer continuing from the first insulating layer 181a shown in FIG. 5 (that is, a layer common to the first insulating layer 181a). On a surface of the first insulating layer 181b are formed the power line 324, the ground line 325, first wiring line portions 71 and third wiring line portions 73, which are spaced apart from one another. The first and third wiring line portions 71 and 73 compose the image signal line 327. In addition, a second insulating layer 182b is formed to cover the power line 324, the ground line 325, the first wiring line portions 71 and the third wiring line portions 73. This second insulating layer 182b is a layer continuing from the second insulating layer 182a shown in FIG. 5 (that is, a layer common to the second insulating layer 182a). A second wiring line portion 72 is formed on a surface of the second insulating layer 182b. The second wiring line portion 72 is covered with a third insulating layer 183b continuing from the third insulating layer 183a shown in FIG. 5. Here, the first to third wiring line portions 71 to 73 are electrically connected to one another to compose the image signal line 327. The first wiring line 71 extends in the Y direction between the power line 324 and the ground line 325 and the third wiring line portions 73 extend in the Y direction to align with the first wiring line portion 71 with the power line 324 or the ground line 325 interposed therebetween. On the other hand, the second wiring line portion 72 extends in the Y direction to intersect with the power line 324 and the ground line 325 and is opposite to the first and third wiring line portions 71 and 73, with the second insulating layer 182b interposed between the second wiring line portion 72 and the first and third wiring line portions 71 and 73. In more detail, the second wiring line portion 72 is extended from an end portion at which the connection terminals 31 are formed and is formed over the entire length of the image signal line 327 extending along the sampling circuit 433. The second wiring line portion 72 is electrically connected to the first wiring line portion 71 via a contact hole Hd formed in the second insulating layer 182b, and simultaneously is electrically connected to the third wiring line portion 73 via a contact hole He formed in the second insulating layer 182b.

The transistors 611 and 612 have a structure similar to that of the pixel transistor 14. That is, as shown in FIGS. 7 and 9, each transistor 611 and 612 has a semiconductor layer 161 having an LDD structure, a gate insulator 163 formed on a surface of the semiconductor layer 161 by a thermal process, and a gate electrode 165 opposite to a channel region 161G of the semiconductor 161 with the gate insulator 163 interposed between the gate electrode 165 and the channel region 161G. As shown in FIG. 7, when viewed from a direction perpendicular to a surface of the element substrate 10, the semiconductor layer 161 of the transistor 611 has a roughly rectangular shape to overlap with the branch portion 324a of the power line 324 and the first wiring line portion 71, and the semiconductor layer 161 of the transistor 612 has a roughly rectangular shape to overlap with the branch portion 325a of the ground line 325 and the first wiring line portion 71. In addition, the gate electrode 165 of the transistor 611 has one end overlapping with a base end portion of the branch portion 324a of the power line 324 and being electrically connected to the branch portion 324a via a contact hole Hf of the first insulating layer 181b and extends in the Y direction along the branch portion 324a from the base end portion to overlap with the channel region 161G of the semiconductor layer 161. Similarly, the gate electrode 165 of the transistor 612 has one end overlapping with a base end portion of the branch portion 325a of the ground line 325 and being electrically connected to the branch portion 325a via a contact hole Hf of the first insulating layer 181b and extends in the Y direction along the branch portion 325a to overlap with the channel region 161G of the semiconductor layer 161. In addition, as shown in FIG. 9, a heavily doped source region 161S of the semiconductor layer 161 of the transistor 611 is electrically connected to the power line 324 (more particularly, the branch portion 324a) via a contact hole Hg passing through the first insulating layer 181b and the gate insulator 163, and a heavily doped source region 161S of the semiconductor layer 161 of the transistor 612 is electrically connected to the ground line 325 (more particularly, the branch portion 325a) via a contact hole Hg passing through the first insulating layer 181b and the gate insulator 163. In addition, each of heavily doped drain regions 161D of the transistors 611 and 612 is electrically connected to the first wiring line portion 71 of the image signal line 327 via a contact hole Hh passing through the first insulating layer 181b and the gate insulator 163.

Here, elements shown in FIGS. 7 to 9 are formed of the same material and in the same process as the elements of the pixel P shown in FIG. 5. In more detail, first, the transistors 611 and 612 are formed of the same material and in the same process as the pixel transistor 14. That is, the semiconductor layers 161, the gate insulators 163 and the gate electrodes 165 of the transistors 611 and 612 are collectively formed of the same materials and in the same processes as the semiconductor layer 141, the gate insulators 143 and the gate electrode 145 (further, the scanning line 11 and the storage-capacitor electrode 171a) of the pixel transistor 14. In addition, the power line 324, the ground line 325, the first and third wiring line portions 71 and 73 of the image signal line 327, and the data line 12 shown in FIG. 5 are collectively formed by patterning a single conductive film (for example, a film made of aluminum) formed on a roughly entire surface (more particularly, surfaces of the first insulating layers 181a and 181b) of the element substrate 10 in a common process. Similarly, the second wiring line portion 72 of the image signal line 327 and the capacitor line 322 shown in FIG. 5 are collectively formed by patterning a single conductive film (for example, a film made of aluminum) formed on a roughly entire surface (more particularly, surfaces of the second insulating layers 182a and 182b) of the element substrate 10 in a common process. In addition, as shown in FIG. 3, the second wiring line portion 72 extends to the connection terminal 31 and has one end connected to the connection terminal 31 via a contact hole (not shown) of the third insulating layer 183b. The connection terminal 31 may be formed of the same material and in the same process as the pixel electrode 15 shown in FIG. 5.

As described above, in the embodiment, the electrostatic protection circuits 60 are arranged to overlap with intersects of the power line 324 or the ground line 325 and the image signal line 327. Accordingly, when viewed from a direction perpendicular to the surface of the element substrate 10, a space on the element substrate 10 required to arrange these elements may be reduced as compared to a configuration where the electrostatic protection circuit 60 is arranged at a position spaced apart from the power line 324 and the ground line 325 and the image signal line 327. In addition, since these elements are formed of the same material and the same process as the elements of the pixel P, manufacture processes may be simplified and manufacture costs may be reduced as compared to a case where these elements are formed in individual processes.

Figure 10:
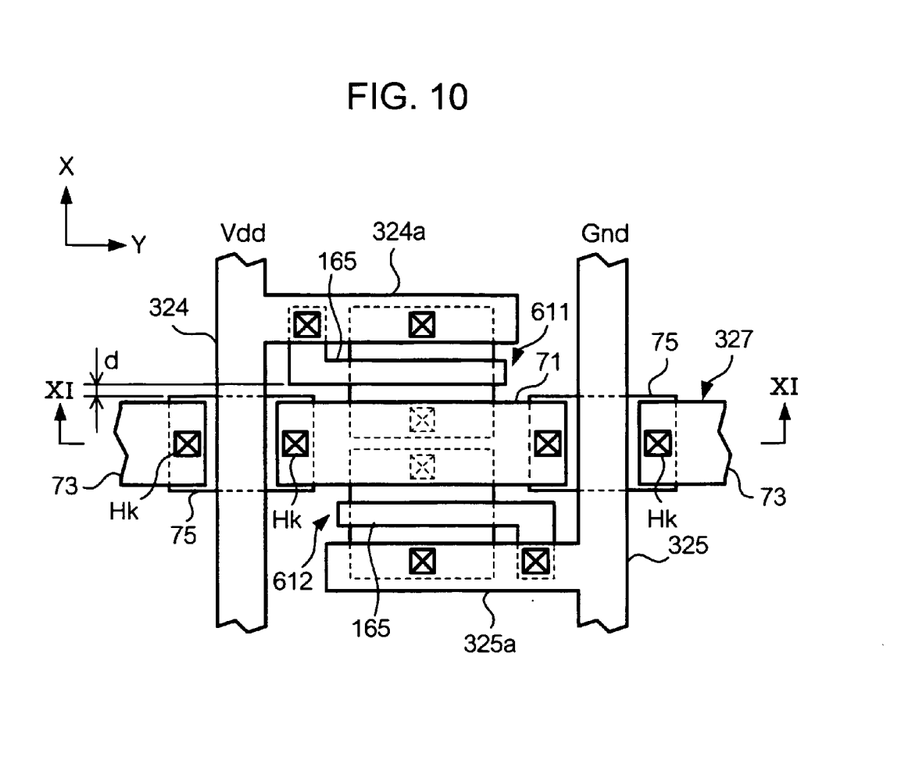
FIG. 10 is a plan view illustrating a peripheral configuration of one electrostatic protection circuit of the liquid crystal display for comparison with the configuration of FIG. 7.
Figure 11:
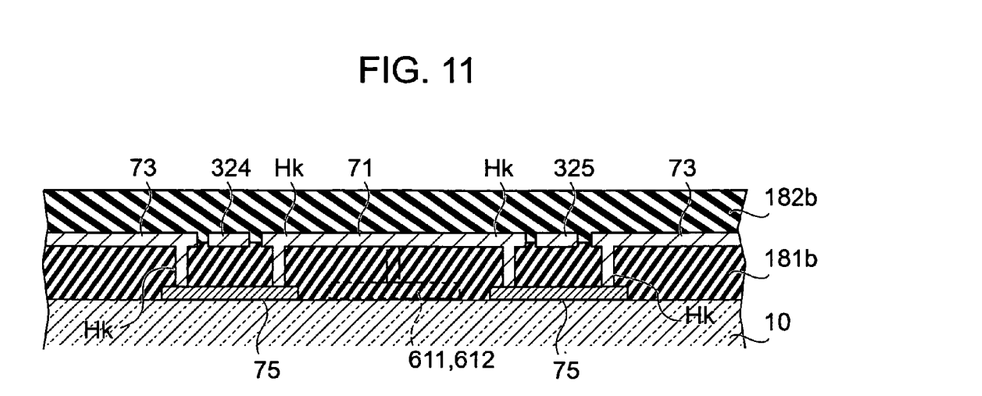
FIG. 11 is a sectional view taken along line XI—XI of FIG. 10.

Moreover, in the embodiment, since the second wiring line portion 72 is integrally formed over the entire length of the image signal line 327, resistance of the image signal line 327 may be reduced. Here, a configuration shown in FIGS. 10 and 11 is also employed as the configuration where the electrostatic protection circuit 60 is arranged to overlap with the power line 324 or the ground line 325 and the image signal line 327. In the configuration shown in these figures (hereinafter, referred to as a comparison configuration), the second wiring line portion 72 shown in FIG. 7 is not formed, and, instead of, a plurality of connecting wiring line portions 75 is formed to partially overlap with the first and third wiring line portions 71 and 73 when viewed from the direction perpendicular to the surface of the element substrate 10. Each of adjacent first and third wiring line portions 71 and 73 is electrically connected to the connecting wiring line portion 75 via a contact hole Hk of the first insulating layer 181b. That is, in this comparison configuration, the image signal line 327 is formed by connecting the first and third wiring line portions 71 and 73 to each other via the connecting wiring line portion 75. Here, in order to simplify the manufacture processes and reduce the manufacture costs, it is preferable to form the connecting wiring line portion 75 in the same process as other elements. In this respect, in the comparison configuration shown in FIGS. 10 and 11, the connecting wiring line portion 75 is formed of the same material (i.e., polysilicon) as the gate electrodes 165 of the transistors 611 and 612. However, in this configuration, although the first and third wiring line portions 71 and 73 are made of a conductive material having lower resistance, such as aluminum, since the connecting wiring line portion 75 made of polysilicon having higher resistance is interposed between the first and third wiring line portions 71 and 73, it is difficult to reduce the overall resistance of the image signal line 327. When the resistance of the image signal line 327 is high, waveforms of the image signals Vid1 to Vid6 may become blunt and delayed, which may result in deterioration of display quality. On the contrary, in the embodiment, since the second wiring line portion 72 is formed over the overall length of the image signal line 327 to intersect with the power line 324 or the ground line 325 and is electrically connected to the first and third wiring line portions 71 and 73, the resistance of the image signal line 327 can be suppressed to be extremely low as compared to the comparison configuration shown in FIG. 10. Accordingly, bluntness or delay of waveforms of the image signals Vid1 to Vid6 may be suppressed, and thus, high display quality can be maintained.

In addition, in order to make the electrostatic protection circuit 60 small-sized in the comparison configuration shown in FIG. 10, it is required to shorten a distance between the branch portion 324a of the power line 324 and the branch portion 325a of the ground line 325 and reduce a width of the first wiring line portion 71 formed of a conductive layer common to the power line 324 and the ground line 325. However, in the comparison configuration, since the reduction in the width of the first wiring line portion 71 leads to the increase in the resistance of the image signal line 327, it is requisite to secure a significant width of the first wiring line portion 71 in order to suppress the deterioration of the display quality due to the resistance of the image signal line 327. Accordingly, the comparison configuration has a limitation to the miniaturization of the electrostatic protection circuit 60. On the contrary, in the embodiment, under the configuration where the second wiring line portion 72 is integrally formed to intersect with the power line 324 and the ground line 325, since the width of the first wiring line portion 71 or the third wiring line width 73 has an insignificant effect on the resistance of the image signal line 327, it is possible to sufficiently narrow the width of the first wiring line portion 71 as long as it can be electrically connected to the transistor 611 or the transistor 612 or sufficiently narrow the width of the third wiring line portion 73 as long as it can be electrically connected to the second wiring line portion 72. Accordingly, the electrostatic protection circuit 60 can be sufficiently miniaturized with no restriction on the width of the first wiring line portion 71 or the third wiring line portion 73.

In addition, in the comparison configuration shown in FIG. 10, the gate electrode 165 and the connecting wiring line portion 75 are formed of a common conductive layer. Under this configuration, it is required to secure a distance d between the gate electrode 165 and the connecting wiring line portion 75 in order to electrically isolate the gate electrode 165 from the connecting wiring line portion 75. In addition, considering an etching error when the single conductive layer is patterned to form the gate electrode 165 and the connecting wiring line portion 75, it is required to more sufficiently secure the distance d between the gate electrode 165 and the connecting wiring line portion 75. However, in order to secure a sufficient distance between the gate electrode 165 and the connecting wiring line portion 75, it is required to widen a distance between the power line 324 and the ground line 325. Accordingly, in the comparison configuration, it is necessary to secure a relatively large space in order to arrange elements such as the power line 324 and the ground line 325. This may cause an obstruction to narrowness of the peripheral region. On the contrary, in the embodiment, since the second wiring line portion 72 is formed of a conductive layer separately from the gate electrode 165, the power line 324 or the ground line 325, the distance d shown in FIG. 10 may have any value. Accordingly, the embodiment provides an advantage in that the distance between the power line 324 and the ground line 325 can be shortened and accordingly the peripheral region can be narrowed, as compared to the comparison configuration shown in FIG. 10.

B: Modifications

Various modifications to the above-described embodiment can be made. Detailed aspects of the modifications are as follows. In addition, combinations of the following aspects may be employed.

Figure 12:
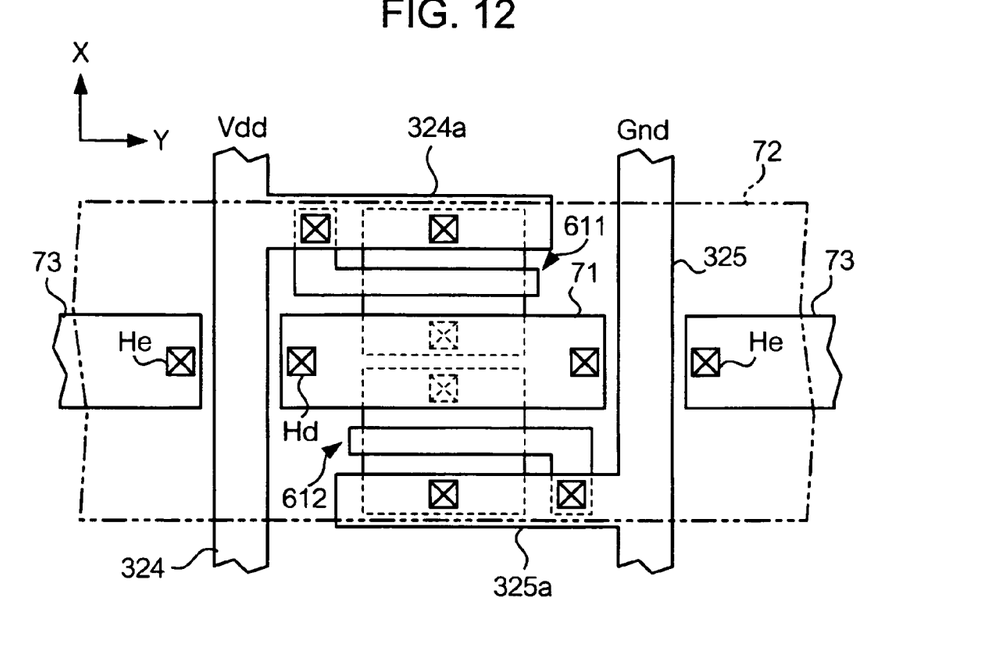
FIG. 12 is a plan view illustrating an example of a modified peripheral configuration of one electrostatic protection circuit of a liquid crystal display.

(1) Although the configuration where the second wiring line portion 72 of the image signal line 327 has the about same width as the first wiring line portion 71 or the third wiring line portion 73 has been exemplified in the embodiment, since the second wiring line portion 72 is formed of a conductive layer separately from the first and third wiring line portions 71 and 73 or the power line 324 and the ground line 325, with the first insulating layer 181b interposed between the second wiring line portion 72 and the first and third wiring line portions 71 and 73 or the power line 324 and the ground line 325, the width of the second wiring line portion 72 can be selected irrespective of other elements. For example, as shown in FIG. 12 (a shape of the second wiring line portion 72 is indicated by a two-dot chain line), a configuration where the width of the second wiring line portion 72 is extended to overlap with the branch portion 324a of the power line 324 and the branch portion 325a of the ground line 325 can be employed. According to this configuration, since the resistance of the image signal line 327 can be suppressed to be low, as compared to the configuration of the above embodiment, the deterioration of the display quality due to the resistance of the image signal line 327 can be more reliably suppressed. In addition, the width of the second wiring line portion 72 can be further extended, as compared to the example shown in FIG. 12, as long as the second wiring line portion 72 is electrically isolated from the image signal line 327 adjacent to the second wiring line portion 72.

(2) Although the configuration where the image signal line 327 is composed of the first to third wiring line portions 71 to 73 has been exemplified in the above embodiment, the third wiring line portion 73 may be properly omitted. That is, the image signal line 327 is sufficient if only it includes the second wiring line portion 72 and the first wiring line portion 71 for connecting the second wiring line portion 72 to the transistors 611 and 622. Above all things, in order to suppress the resistance of the image signal line 327 to be low, it is preferable to electrically connect the second wiring line portion 72 to the third wiring line portion 73 in addition to the first wiring line portion 71, as shown in the embodiment.

(3) The configuration where the electrostatic protection circuit 60 including the transistors 611 and 612 has been exemplified in the embodiment. According to the configuration, both of the positive and negative polarity overvoltages for a certain potential (for example, an intermediate potential between the higher-side potential Vdd and the lower-side potential Gnd) can be suppressed. However, for a configuration where one of both overvoltages is suppressed by elements other the electrostatic protection circuit 60, a configuration where there is no possibility (or a bare possibility) of occurrence of one of both overvoltages, or a configuration where there is no need to suppress one of both overvoltages, one of the transistors 611 and 612 may be properly omitted. That is, according to a configuration where the transistor 611 shown in FIG. 6 is omitted, an electrostatic protection circuit 60 for suppressing only the negative polarity overvoltage by the transistor 612 is realized, and, according to a configuration where the transistor 612 is omitted, an electrostatic protection circuit 60 for suppressing only the positive polarity overvoltage by the transistor 611. As apparent from this, it is not essential to form two kinds of wiring lines (i.e., wiring lines to which an approximately positive potential is applied), such as the power line 324 and the ground line 325, such that they reach the electrostatic protection circuit 60, and one of these wiring lines may be properly omitted depending on the polarity of the overvoltage to be suppressed. In addition, although the configuration where the power line 324 and the ground line 325 are connected to the electrostatic protection circuit 60 has been exemplified in the embodiment, wiring lines to be connected to the electrostatic protection circuit 60 is not limited to this. That is, it is sufficient if wiring lines (static potential wiring lines) maintaining a roughly constant potential are connected to the electrostatic protection circuit 60.

(4) Although the configuration where the electrostatic protection circuit 60 includes the transistors 611 and 612 has been exemplified in the embodiment, a diode may be employed instead of these transistors. That is, diodes each having an anode connected to the image signal line 327 and a cathode connected to the power line 324 may be formed instead of the transistor 611, and a diode having an anode connected to the ground line 325 and a cathode connected to the image signal line 327 may be formed instead of the transistor 612. In other words, it is sufficient to employ a switching element having a first terminal (the drain electrode of the transistor 611 or the drain electrode of the transistor 612) connected to the image signal line 327 and a second terminal (the source electrode of the transistor 611 or the source electrode of the transistor 612) connected to the power line 324 or the ground line 325, which are electrically connected to each other when the overvoltage is applied to the image signal line 327, irrespective of other conditions of the switching element.

(5) Although the liquid crystal device D has been exemplified in the embodiment, the invention is applicable to devices using electro-optical substance other than liquid crystal. The electro-optical substance is referred to as substance whose optical properties, such as transmittance or brightness, are varied when an electrical signal (a current signal or a voltage signal) is applied thereto. For example, the invention is applicable to various electro-optical devices including display devices using OLED elements, such as organic EL or light emitting polymers, as the electro-optical substance, electrophoresis display devices using microcapsules containing colored liquid and white particles dispersed in the colored liquid as the electro-optical substance, twist ball displays using twist balls painted in different colors for regions having different polarities as the electro-optical substance, toner displays using a black toner as the electro-optical substance, plasma display panels using high-pressurized gases, such as helium and neon, as the electro-optical substance, etc.

C: Electronic Apparatus

Figure 13:
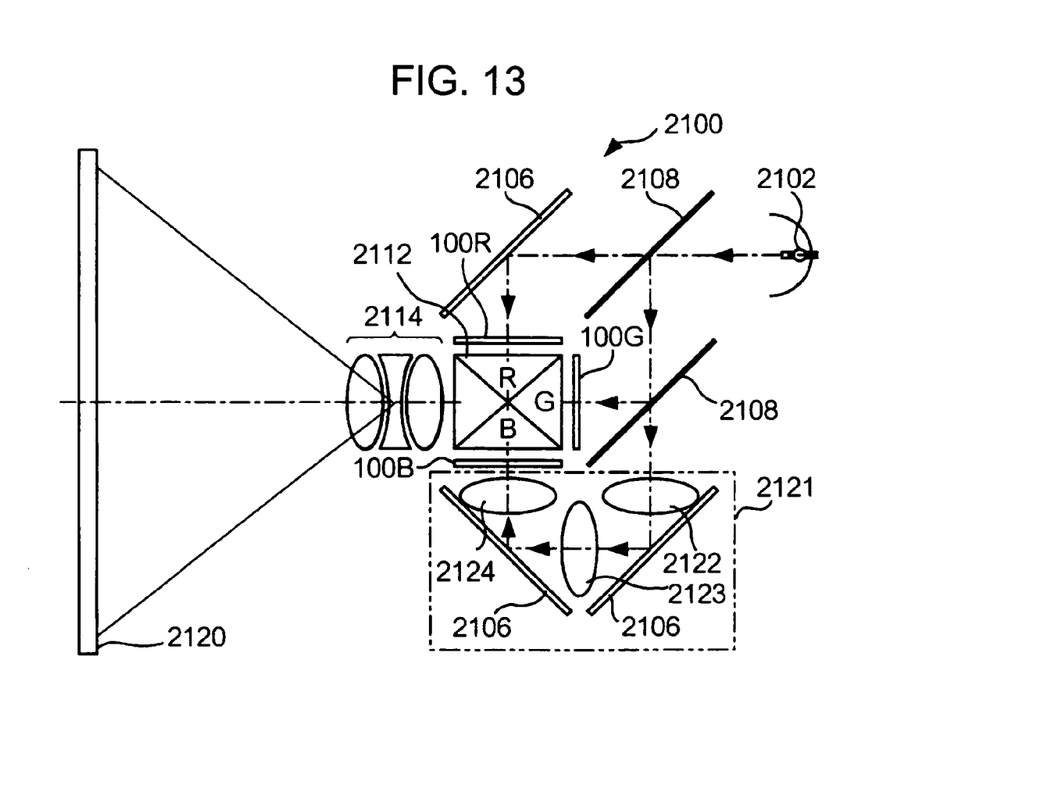
FIG. 13 is a view illustrating a configuration of a projector as an example of an electronic apparatus according to the invention.

Next, as an example of an electronic apparatus using the electro-optical device according to the embodiment, a projector using the liquid crystal device D as a light valve will be described. FIG. 13 is a plan view illustrating a configuration of the projector. As shown in the figure, within the projector 2100 is arranged a lamp unit 2102 comprising a white light source such as a halogen lamp. Projection light projecting from the lamp unit 2102 is divided into three red (R), green (G) and blue (B) primary colors by three mirrors 2106 and two dichroic mirrors 2108, which are arranged within the projectors 2100. The three primary colors are guided to light values 100R, 100G and 100B corresponding to the primary colors, respectively. Since the blue (B) light has a relatively long optical path as compared to the red (R) and green (G) light, it is guided via a relay lens system 2121 comprising an entrance lens 2122, a relay lens 2123, and an exit lens 2124 in order to prevent a light loss.

Here, the light valves 110R, 100G and 100B have the same configuration as the liquid crystal device D in the above embodiment and are driven by image signals corresponding to R, G and B colors, respectively, which are supplied from a process circuit (not shown). Light modulated by the light valves 100R, 100G and 100B is incident into a dichroic prism 2112 in three directions. In the dichroic prism 2112, the red (R) and blue (B) light is refracted by 90 degrees, while the green (G) light goes straight. Accordingly, after images having respective colors are combined, a color image is projected onto a screen 2120 by a projection lens 2114.

In addition, since light corresponding to the R, G and B primary colors is incident into the light valves 100R, 100G and 100B by the dichroic mirror 2108, there is no need to provide color filters. In addition, since a transmission image of the light valve 100G is projected as it is while transmitted images of the light valves 100R and 100B are projected after being reflected by the dichroic prism 2112, a horizontal scan direction by the light valves 100R and 100B is opposite to a horizontal scan direction by the light valve 100G to display left and right inverted images.

Further, in addition to the projector shown in FIG. 13, the electronic apparatus to which the electro-optical device according to the invention may be applied may include portable telephones, portable personal computers, liquid crystal TVs, view finder type (or monitor direct-view type) video tape recorders, car navigators, pagers, electronic pocket notebooks, calculators, word processors, workstations, video telephones, point-of-sale (POS) terminals, apparatuses equipped with touch panels, etc.

What is claimed is:

1. An electro-optical device comprising:
    a scanning line;
    a data line intersecting the scanning line;
    a pixel corresponding to an intersection of the scanning line and the data line;
    a sampling circuit that samples image signals from the data line and supplies the sampled image signals to the pixel when the scanning line is selected;
    an electrostatic protection circuit that includes a switching element having a first terminal and a second terminal, the first terminal being electrically connected to the second terminal when an overvoltage is applied to the first terminal;
    a first insulating layer covering the switching element, the first insulating layer having contact holes;
    a static potential wiring line formed on the first insulating layer and connected to the second terminal of the switching element through one of the contact holes of the first insulating layer, the static potential wiring line being applied with substantially constant potential;
    a second insulating layer covering the static potential wiring line and a first wiring line portion, the second insulating layer having contact holes; and
    an image signal line that transmits the image signals supplied to the sampling circuit, the image signal line including:
    the first wiring line portion formed of the same conductive film as the static potential wiring line, the first wiring line portion being spaced apart from the static potential line, and connected to the first terminal of the switching element through another of the contact holes of the first insulating layer, and
    a second wiring line portion formed on the second insulating layer, connected to the first wiring line portion through a contact hole of the second insulating layer, and extending to intersect with the static potential wiring line as viewed from a direction perpendicular to the surface of the substrate.

2. The electro-optical device according to claim 1, wherein the electrostatic protection circuits include first and second switching elements each having the first and second terminals,
    the static potential wiring lines include a first static potential wiring line connected to the second terminals of the first switching elements and a second static potential wiring line extending in substantially the same direction as the first static potential wiring line and connected to the second terminals of the second switching elements, a potential applied to the second static potential wiring line being lower than a potential applied to the first static potential wiring line, and
    the first wiring line portions of the image signal lines are formed between the first static potential wiring line and the second static potential wiring line, and the second wiring line portion extends to intersect with both of the first static potential wiring line and the second static potential wiring line.

3. The electro-optical device according to claim 2, wherein the first static potential wiring line is a power line to which a higher-side potential of a power source is applied, and the second static potential wiring line is a ground line to which a lower-side potential of the power source is applied.

4. The electro-optical device according to claim 2, wherein the image signal lines have a plurality of third wiring line portions formed of the same conductive film as the first and second static potential wiring lines and the first wiring line portions and arranged in a direction in which the second wiring line portion extends, and the second wiring line portion is connected to the first wiring line portions and the third wiring line portions via the contact hole of the second insulating layer.

5. The electro-optical device according to claim 4, wherein each of the plurality of third wiring line portions is arranged at a position at which each of the static potential wiring lines is interposed between the first wiring line portion and the third wiring line portion when viewed from the direction perpendicular to the surface of the substrate.

6. The electro-optical device according to claim 2, wherein the first switching elements and the second switching elements are interposed between the first static potential wiring line and the second static potential wiring line when viewed from the direction perpendicular to the surface of the substrate, the first static potential wiring line has branch portions projecting toward the second static potential wiring line in one side in the width direction of the image signal line and connected to the second terminals of the first switching elements, and the second static potential wiring line has branch portions projecting toward the first static potential wiring line in the other side in the width direction of the image signal line and connected to the second terminals of the second switching elements, and the second wiring line portions of the image signal lines have a width equal to the width by which the second wiring line portions overlap with the branch portions of the first static potential wiring line and the branch portions of the second static potential wiring line when viewed from the direction perpendicular to the surface of the substrate.

7. The electro-optical device according to claim 6, wherein the first switching elements and the second switching elements are interposed between the branch portions of the first static potential wiring line and the branch portions of the second static potential wiring line when viewed from the direction perpendicular to the surface of the substrate.

* * * * *